(12) United States Patent
Guindulain Vidondo

(10) Patent No.: US 6,779,436 B2
(45) Date of Patent: Aug. 24, 2004

(54) SYSTEM FOR PREPARING HOT BEVERAGES IN AUTOMATIC VENDING MACHINES

(75) Inventor: Félix Guindulain Vidondo, Peralta (ES)

(73) Assignee: Jofemar, S.A., Peralta (ES)

( * ) Notice: Subject to any disclaimer, the term of this patent is extended or adjusted under 35 U.S.C. 154(b) by 32 days.

(21) Appl. No.: 10/228,831

(22) Filed: Aug. 27, 2002

(65) Prior Publication Data

US 2003/0209150 A1 Nov. 13, 2003

(30) Foreign Application Priority Data

May 8, 2002 (ES) .......................................... 200201056

(51) Int. Cl.$^7$ ................................................ A41J 31/34

(52) U.S. Cl. ...................... 99/302 P; 99/289 R; 99/287

(58) Field of Search ........................... 99/302 P, 302 R, 99/289 R, 287

(56) References Cited

U.S. PATENT DOCUMENTS

| | | | | |
|---|---|---|---|---|
| 4,579,049 A | * | 4/1986 | Rodrigues | 99/289 R |
| 5,259,296 A | * | 11/1993 | Mikael et al. | 99/280 |
| 5,964,142 A | * | 10/1999 | Tio | 99/289 R |
| 6,101,923 A | * | 8/2000 | Karg et al. | 99/289 D |

\* cited by examiner

*Primary Examiner*—Reginald L. Alexander
(74) *Attorney, Agent, or Firm*—Klauber & Jackson

(57) ABSTRACT

System for preparing hot beverages in automatic vending machines, of the known type of hot beverage vending machines, and especially for the preparation of coffee, having a distribution chamber (6), a shaft (5) which by one of its ends connects rotatably, a pair of movement transmitting connecting rods (4). The shaft (5) is guided by a first pair of through side guides (8) materialized in the side walls (25) of the assembly body (1) of the whole system, whose pair of grooves (8) has a first horizontal section (9) and a second section (10) inclined with respect to the second production preparation position. A second guiding shaft (11) collaborates in the guiding of the distribution chamber (6) by a second pair of side guides (12) materialized in the side walls (25) of the assembly body (1) of the whole system.

19 Claims, 9 Drawing Sheets

SYSTEM FOR PREPARING HOT BEVERAGES IN AUTOMATIC VENDING MACHINES

OBJECT OF THE INVENTION

As expressed in the title of the present specification, the following invention refers to a system for preparing hot beverages in automatic vending machines, being useful to be included in known hot beverage automatic vending machines, and especially for the preparation of coffee, in such a way that by means of the proposed system there is an attempt to obtain an assembly as low as possible, in order to permit the assembly of compartments of the different components necessary to make the different products with the largest possible capacity.

Hence, the system is based on positioning in different vertical planes the precise components of the system for preparing the products and the same is preferably useful in the preparation of coffee, in such a way that the distribution chamber from a vertical resting and loading position, is moved to an inclined position for the preparation of the product itself, to later return to its vertical resting and loading position. The pressed tablet has been discharged and a new product can be prepared.

The guided cyclic movement of the distribution chamber, with respect to two pairs of guides, is caused by means of a pair of connecting rods with respect to respective driving wheels rotating by a shared shaft, in such a way that in a rotation of 360° of the pair of driving wheels the operation of preparing a cup of coffee is materialized.

TECHNICAL FIELD OF THE INVENTION

The system for preparing hot beverages, and specifically coffee, is applicable to be included in all types of hot beverage automatic vending machines.

BACKGROUND OF THE INVENTION

Among systems for preparing hot beverages, and more specifically coffee, we can cite the one wherein the distribution chamber, once it has received the corresponding dose of ground coffee, rotates and rises abutting against a fixed piston for the purpose of pressing the dose of ground coffee. The water then proceeds to be introduced in relation to the bottom part of the fixed base filter of the distribution chamber for the preparation of the cup of coffee.

Then, the elimination of the pressed tablet of ground coffee formed in the distribution chamber should be proceeded with, for which purpose it is the chamber itself that moves downward, while the base filter thereof does not move. This makes the cited released tablet, rest freely on the base filter, with the subsequent rotation of the assembly of the distribution chamber and the base filter thereof, be moved by the conveying funnel itself of the dose of ground coffee to the distribution chamber.

For this purpose, the conveying funnel of the dose of ground coffee towards the distribution chamber has a small rotating movement that permits movement thereof with respect to the base filter, materializing a perfect cleaning thereof.

The system includes a rotating body in a position below the distribution chamber provided with an eccentric related to the piston of the base filter of the distribution chamber in order to transmit this upward and downward movement to it, as the opposite end of the piston with respect to the base filter of the distribution chamber is guided, with respect to a part fixed to the rotating shaft of the bottom body.

The different operations that are produced in the preparation of the coffee are caused by means of a pair of connecting rods connected by one of their ends to the bottom rotating body and to the body comprising the distribution chamber.

On the other hand, we can cite European patent EP 0948926 wherein an automatic coffee machine is described and claimed and wherein, in an initial position, the distribution chamber discharges into a conveying funnel of the corresponding dose of ground coffee, in such a way that once the dose of ground coffee has been deposited in the distribution chamber it proceed to turn and it faces a piston which in its movement, from its resting position, causes the pressing of the dose of ground coffee deposited in the distribution chamber.

Likewise, the water is introduced through the shaft of the pressing piston of the dose of ground coffee, and finally, the removal of the tablet of pressed coffee will take place from the distribution chamber, for which purpose, the pressing piston of the dose of ground coffee is moved from its pressing position to its first resting position. It actuates simultaneously on the base filter of the distribution chamber, by means of a tiltable plate, causing the removal of the tablet of pressed coffee up to the top level of the distribution chamber, the table resting freely thereon, permitting its removal.

With the subsequent rotation of the distribution chamber, the tablet of pressed coffee abuts against the conveying funnel of the ground coffee to the distribution chamber, moving it so that the distribution chamber is prepared to receive a fresh dose of ground coffee, once the base filter has been moved to its resting position.

Likewise, the system includes a pair of connecting rods that transmit the movement to the distribution chamber from the driving element, for the purpose of causing the different operations in the process of preparing the cup of coffee.

On the other hand, we can cite Spanish patent of invention no. P200101136 in the name of the same owner as this application, which describes "a system for preparing hot beverages in automatic vending machines", whose system comprises a body wherein a conveying funnel and feeding of the dose of ground coffee to the distribution chamber and a pressing piston of the dose of ground coffee in the distribution chamber are defined. Said body is guided by means of respective pivots located in relation to a pair of connected guides, upon being connected to a pair of connecting rods that transmit movement to it. The funnel or piston discharges into the distribution chamber, depending on the operation to be carried out in the preparation of a cup of coffee, whereas the distribution chamber remains static.

DESCRIPTION OF THE INVENTION

The present specification describes a system for preparing hot beverages in automatic vending machines, being of the type of known hot beverage automatic vending machines, and especially for the preparation of coffee, which have a distribution chamber in which the corresponding dose of ground coffee is introduced and pressed, in such a way that the system comprises an assembly body of the whose system, in such a way that the distribution chamber has a first vertical resting and loading position and a second inclined position for the preparation of the product. The distribution chamber is movable from one position to another by means of a pair of connecting rods to which it connects rotatably, by one of its ends. Said pair of connecting rods is connected by their other end in an eccentric position to respective driving rotating wheels, in such a way that the distribution chamber has a shaft to which by one of its ends connects rotatably, the pair of movement transmitting connecting rods. Said shaft is guided by a first pair of through side guides materialized in the side walls of the assembly body of the whole system, whose first pair of grooves have a first horizontal section and a second section inclined with respect to the second position for production of the product.

A second guiding shaft collaborates in the guiding of the distribution chamber by a second pair of guides materialized on the inside surface of the side walls of the assembly body of the whole system, having means for the operation of the filter under the distribution chamber by means of a shaft integral thereto, and whose shaft is clamped by a spring, that impels the filter towards its bottom operating position.

The frame that defines the distribution chamber is moved from its first resting and loading position to its second product preparation position, conveyed with respect to the two pairs of side guides materialized in the side walls of the assembly body of the whole system. The elements comprising the frame are kept static, in other words, the frame that mounts the different components is moved, without the components being actuated during said movement.

The second pair of side guides conveying the distribution chamber, in which the corresponding shaft fits, is defined by a recess of the inside surface of the side walls of the body that houses the assembly of components of the system, being wider than that first pair of guides, in such a way that the second pair of guides overlap, approximately, half their length, with the second section inclined of the first pair of guides.

The means for the operation of the bottom filter of the distribution chamber, for the purpose of being able to remove the pressed tablet of coffee, once the coffee has been prepared, are defined by a rotating plate arranged between the top part of the pair of driving wheels, whose plate has on its inside surface a circular surface concentric to the shaft of the driving wheels, whereon on the outside surface of the plate there if a curved concavity with respect to the area of abutment with the shaft of the filter of the distribution chamber.

Between the pair of driving wheels there is an eccentric shaft actuating the rotating operating plate of the bottom filter of the distribution chamber, contacting it with respect to its circular bottom surface concentric with the rotating shaft of the pair of driving wheels.

The distribution chamber from its second product preparation position is moved towards its resting position. The bottom plate actuates simultaneously on the filter shaft recoiling the spring which clamps it, in such a way that the downward movement of the frame of the distribution chamber causes the pressed tablet of coffee to rise so that it is removed through a small projection of the bottom base of the feed funnel of the doses of ground coffee.

The filter shaft of the distribution chamber is integral to it, by means of an anchoring screw, in such a way that the filter shaft and the spring that clamps it are in relation to a tubular section of the frame of the distribution chamber. The bottom part integral to the filter shaft is movable by the tubular section and the bottom part acts like an abutment of the spring that clamps it, in such a way that the base itself of the distribution chamber acts as an abutment of the assembly defined by the filter, the shaft and the bottom part integral therewith.

In order to complete the description that is going to be made hereinafter, and for the purpose of providing a better understanding of the characteristics of the invention, the present specification is accompanied by a set of drawings, in whose figures, the most characteristic details of the invention are represented in an illustrative and non-restrictive manner.

DESCRIPTION OF AN EMBODIMENT OF THE INVENTION

Figure 1:
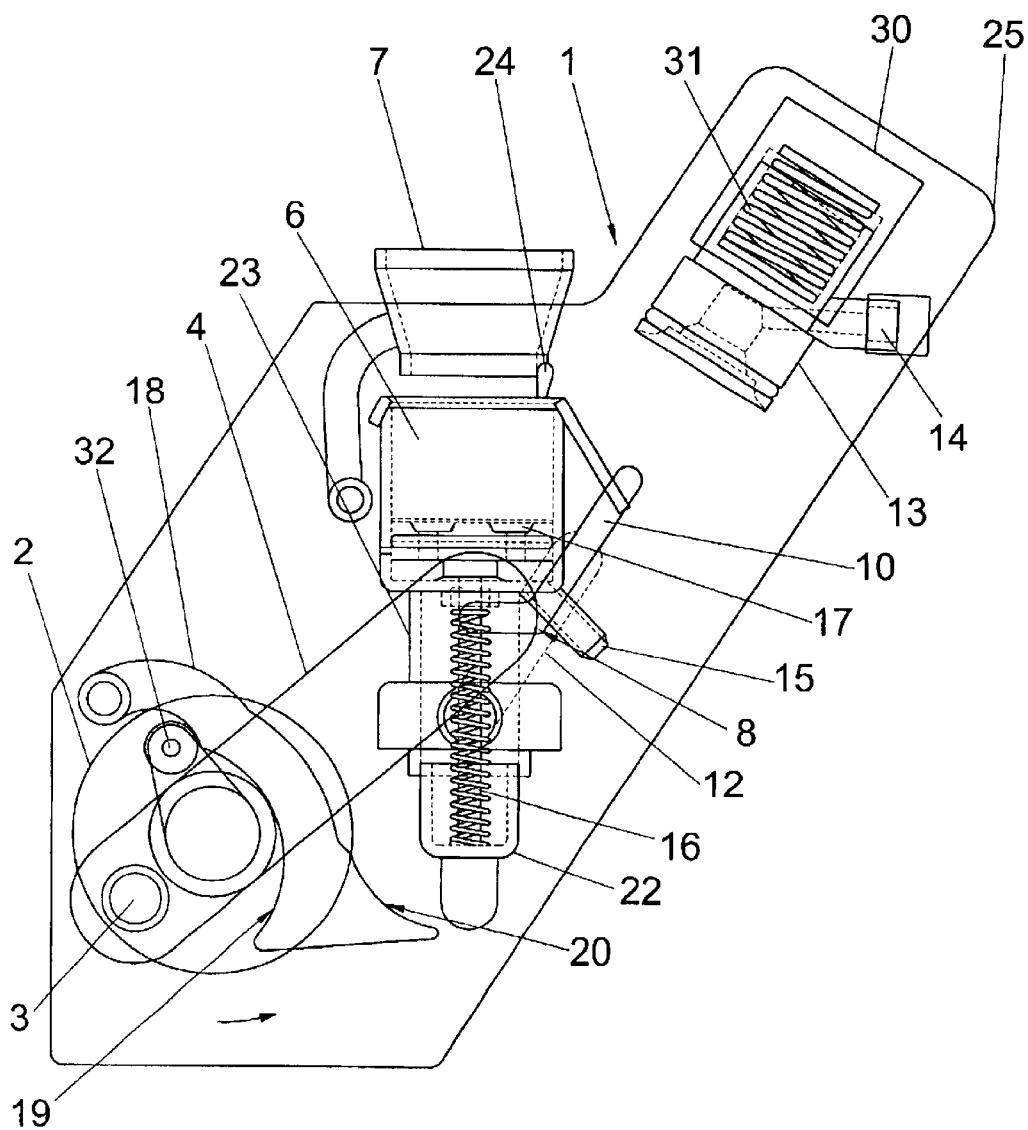
FIG. 1 shows a side raised view of a first resting position of the system for preparing coffee, it being possible to see how the distribution chamber is opposite a feeding and conveying funnel of the doses of ground coffee.

In view of the commented figures and in accordance with the numbering used, we can see how all the components of the system for preparing coffee are assembled in a body (1) grouping them all together, in such a way that said body (1) has a pair of rotating wheels (2), the corresponding driving element transmitting movement to the wheels (2).

Hence, conventionally, the system includes a pair of wheels (2), to which a pair of connecting rods (4) in relation to each one of its ends is connected rotatably and eccentrically to a shaft (3), in combination with which movement is transmitted to the different components of the system that take part in the automatic preparation of the different types of coffee.

On the other hand, the pair of connecting rods (4) by the end opposite the connection thereof to the pair of wheels (2) connects rotatably to a shaft with respect to the frame of the distribution chamber (6), which is capable of adopting two positions, a first resting and loading position under the feeding and conveying funnel (7) of the doses of coffee to the cited distribution chamber and a second chamber for preparing the cup of coffee itself.

Hence, the shaft (5) integral to the frame of the distribution chamber (6) to which the pair of connecting rods (4) transmitting movement, connects rotatably by one of their ends, is guided by a first pair of through side guides (8) materialized in the side walls (25) of the assembly body (1) of the whole system, whose first pair of grooves (8) has a first horizontal section (9) and a second section (10) inclined upward with respect to the second product preparation position.

Furthermore, a second shaft (11), likewise, integral to the frame of the distribution chamber (6) collaborates in the guiding of the distribution chamber (6) by the shaft (5), by the guiding thereof by a second pair of side guides (12) materialized, likewise, in the side walls (25) of the assembly body (1) of the whole system.

Hence, the frame that defines the distribution chamber (6) is moved from its first resting and loading position to its second position for preparing the product itself, conveyed with respect to two pairs of side guides (8) and 12) materialized in the side walls of the assembly body (1) of the whole system, keeping the elements comprising the same static.

For this purpose, the second pair of side guides (12) conveying the distribution chamber (6), which the correspond shaft (11) fits in, are defined by a recess of the inside surface of the side walls (25) of the body (1) that houses the assembly of components of the system. It is wider than the first pair of guides (8), in such a way that the second pair of guides (12) overlap, approximately, half their length, with the second inclined section (10) of the first pair of guides (8).

In this way, upon conveying the distribution chamber (6) from its first resting and loading position to its second coffee preparation position, duly guided by the pair of guides (8) and (12), the distribution chamber (6) is opposite the piston (13), in such a way that in the forward movement of the distribution chamber (6), the piston fits inside said distribution chamber (6) for the purpose of causing the pressing of the dose of ground coffee housed therein.

Then the water for the preparation of the cup of coffee will be introduced, through the mouth (14), conveying it to a small chamber (29) of the body of the piston (13) in order to introduce it in the distribution chamber (6) through some grooves (27) of the side surface of the truncated-cone-shaped body (28) wherein the connection shaft (26) of the piston (13) terminates with part (30) in which it is housed. The piston is aided by a return spring (31).

Given that in the second coffee preparation position the distribution chamber (6) is in an inclined position facilitating the outflow of the coffee prepared through the mouth (15) towards the cup by the user.

Once the cup of coffee has been prepared, the distribution chamber (6) should return to its resting and loading position, so that during its return the pressed tablet of coffee is released from the distribution chamber, for which purpose the corresponding filter (17) of the chamber is actuated upon.

Hence, the operating means of the bottom filter (17) of the distribution chamber (6) are defined by a rotating plate placed between the top part of the pair of driving wheels (2), whose plate (18) has on its bottom surface a circular surface section (19) concentric with the rotating shaft, of the two driving wheels (2), whereas on the outside surface there is a curved-concave section (20) with respect to the area actuating on the shaft (16) of the filter (17) of the distribution chamber (6). The shaft (16) is integral to a bottom part (22) and clamped by a spring (21).

As one can see in the figures the shaft (16) is fastened to the filter (17) of the distribution chamber (6) by means of the screw (33), whose shaft (16) is housed in a cavity (23) of the frame of the distribution chamber (6), through whose cavity the part (22) integrals to the shaft (16) and on whose part the plate (18) actuates, is moveable and perfectly guided, in such a way that the filter (17) abuts against the base of the distribution chamber itself, the spring (21) impelling the filter towards said position.

In this way, in the passing of the distribution chamber (6) from its second position for preparing coffee itself to its first resting and loading position, the distribution chamber (6) is moved actuating, simultaneously, on the shaft (16) fixed to the filter (17) by means of the bottom plate (18) recoiling the spring (21) that clamps it, in such a way that the downward movement of the frame of the distribution chamber (6), by the pairs of guides (8) and (12), and keeping the shaft (16) in position, causes the pressed tablet of coffee to rise in order to be released through a small projection (24) of the bottom base of the feeding funnel (7) of the doses of ground coffee.

For this purpose, a shaft (32) arranged between the inside surface of the wheels (2) in eccentric position actuates on the plate (18), in such a way that in the rotation of the pair of wheels (2) the eccentric shaft (32) abuts against the area (19) of the bottom surface of the plate (18) concentric with the rotating shaft of said wheels (2) keeping it in position, thus, holding back the shaft (16).

Hence, in a complete rotation of 360° of the pair of wheels (2), the corresponding preparation of the cup of coffee takes place, the system being ready to start preparing a new cup of coffee.

Basing ourselves on the attached figures, we can see how in FIG. 1 the system is in its resting position with the funnel (7) directed towards the distribution chamber (6), in such a way that upon receiving the instructions to prepare a cup of coffee, the feeding of a dose of ground coffee to the distribution chamber (6) takes place, the dose of coffee being duly conveyed through the funnel (7).

Figure 2:
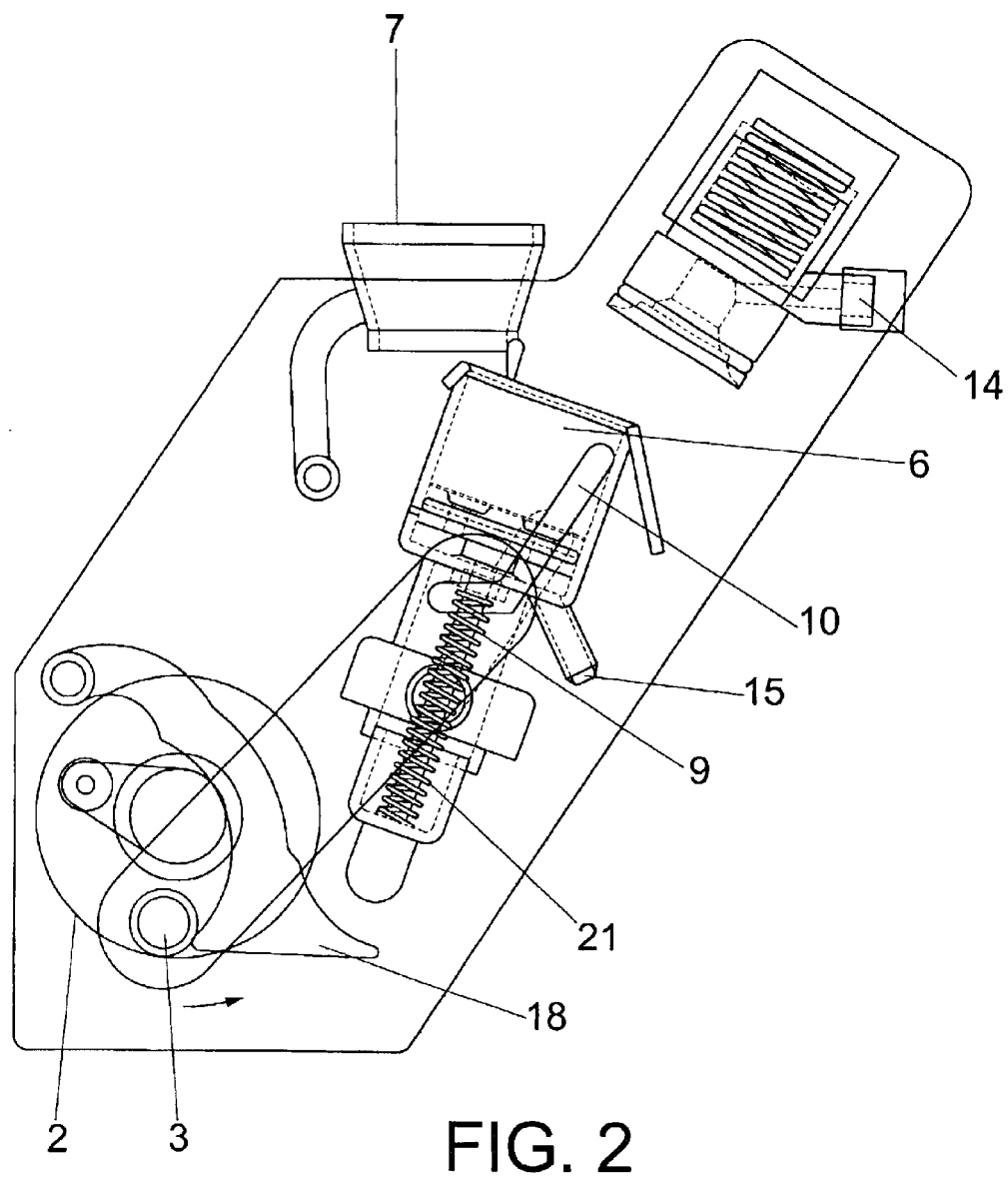
FIG. 2 shows a side raised view of the system for preparing coffee, once the corresponding dose of ground coffee has been introduced in the distribution chamber and the cited distribution chamber has started to rotate.
Figure 3:
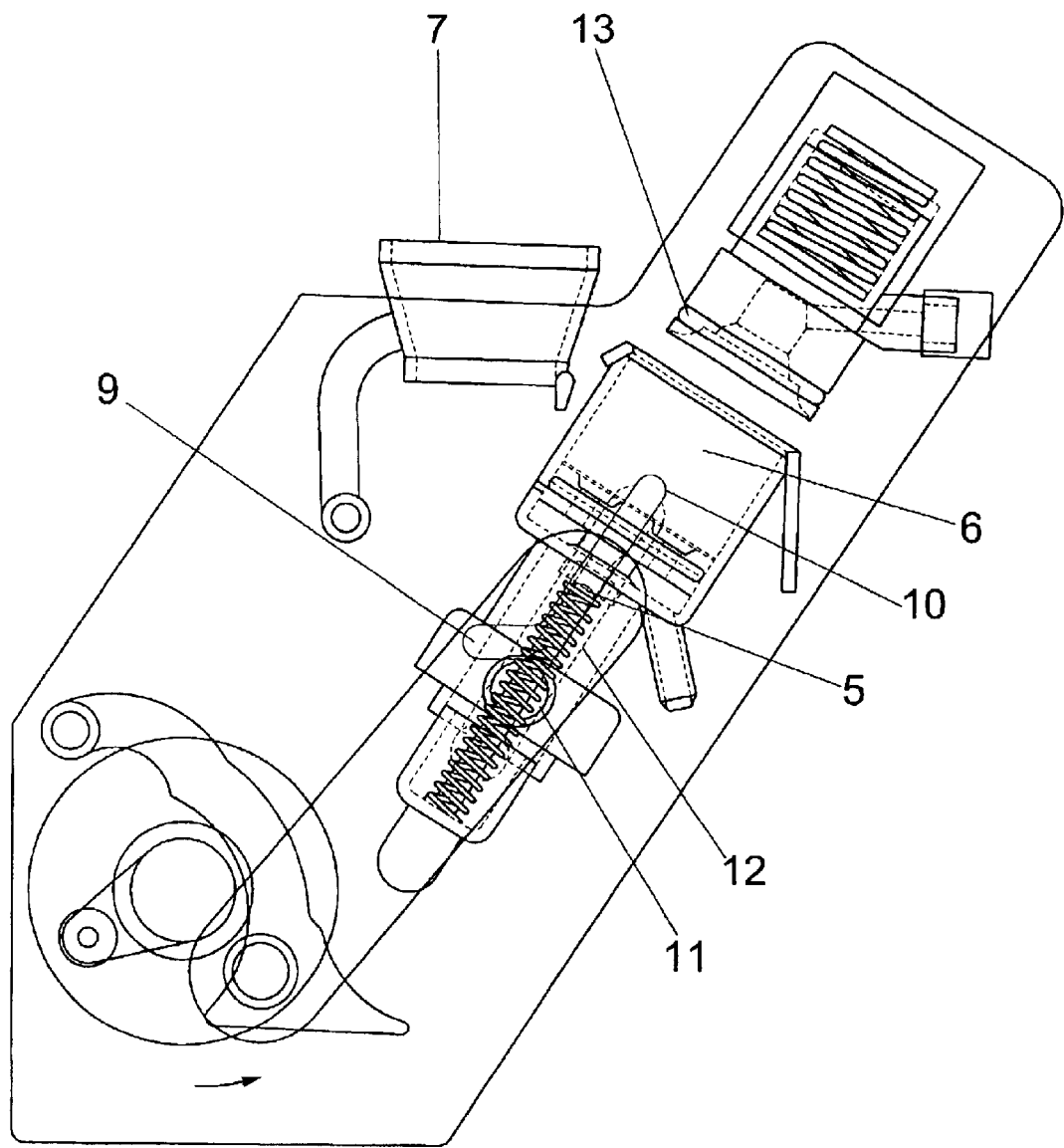
FIG. 3 shows a side raised view of the system for preparing coffee, wherein the distribution chamber is opposite the pressing piston of the coffee introduced in the distribution chamber.

Then, the operation of the pair of wheels (2) is produced, the rotation thereof conveying the pair of connecting rods (4), the pair of connecting rods causing the rotating movement of the distribution chamber (FIG. 2), rotating with respect to the shaft (11) and the shaft (5) being moved by the horizontal section (9) of the pair of guides (8).

Figure 4:
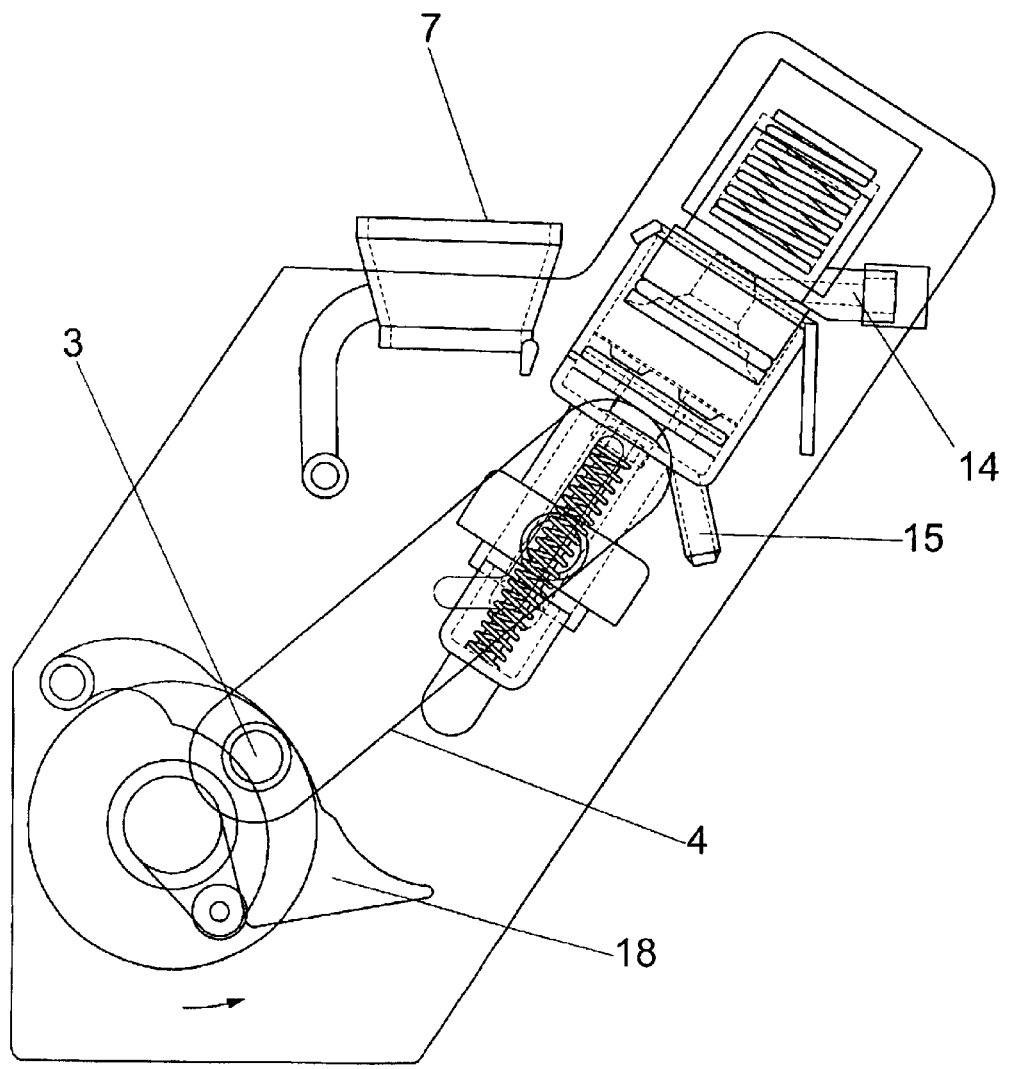
FIG. 4 shows a side raised view of a second position of the system wherein the coffee pressing piston fits in the distribution chamber pressing the dose of ground coffee, in accordance with the maximum movement of the distribution chamber, in whose position the water is supplied.
Figure 5:
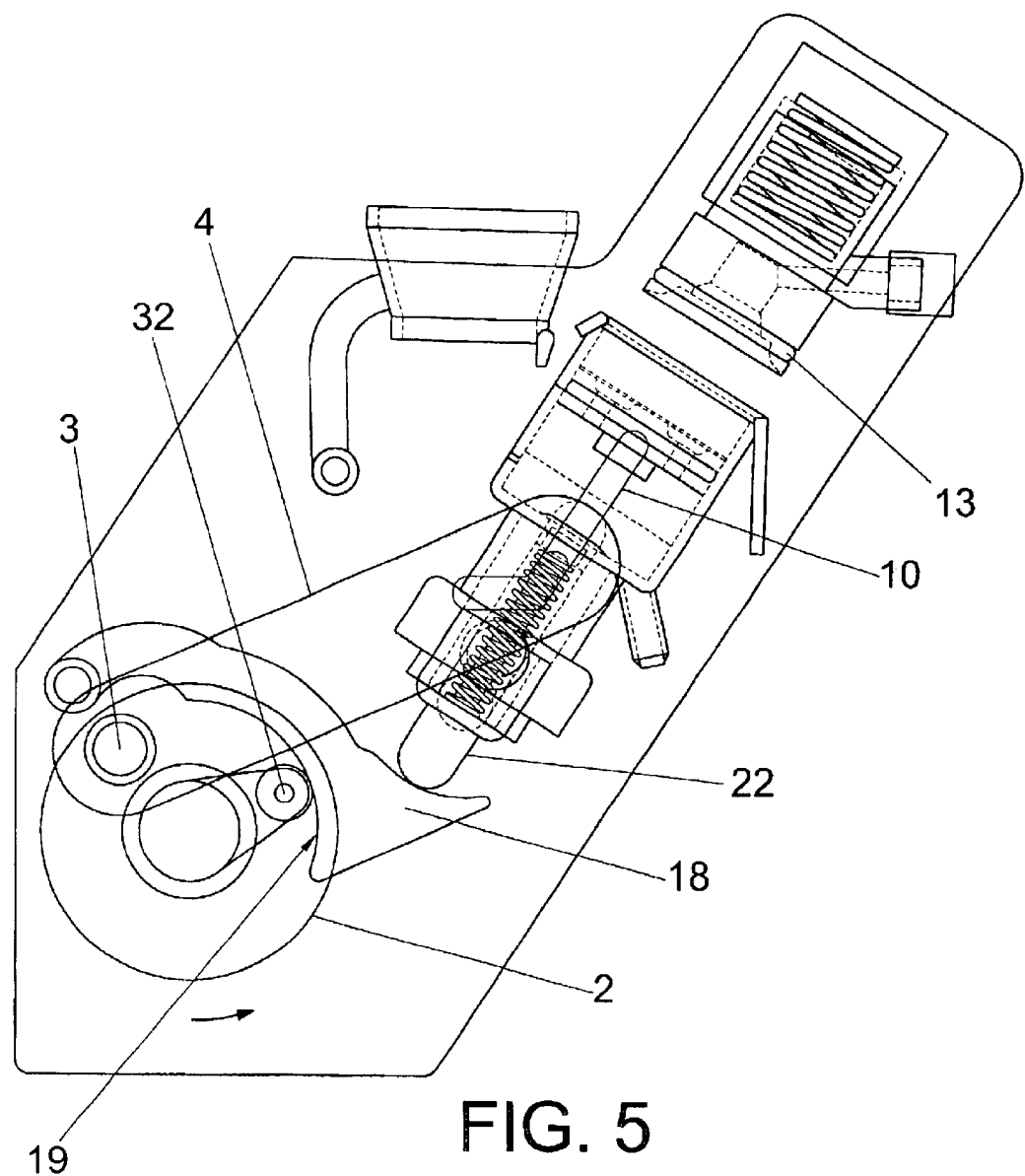
FIG. 5 shows a side raised view in a position of the system for preparing coffee, wherein the distribution chamber has moved downward releasing the coffee pressing piston, at the same time that the base filter of the distribution chamber has been kept in position for the removal of the tablet of pressed coffee.
Figure 6:
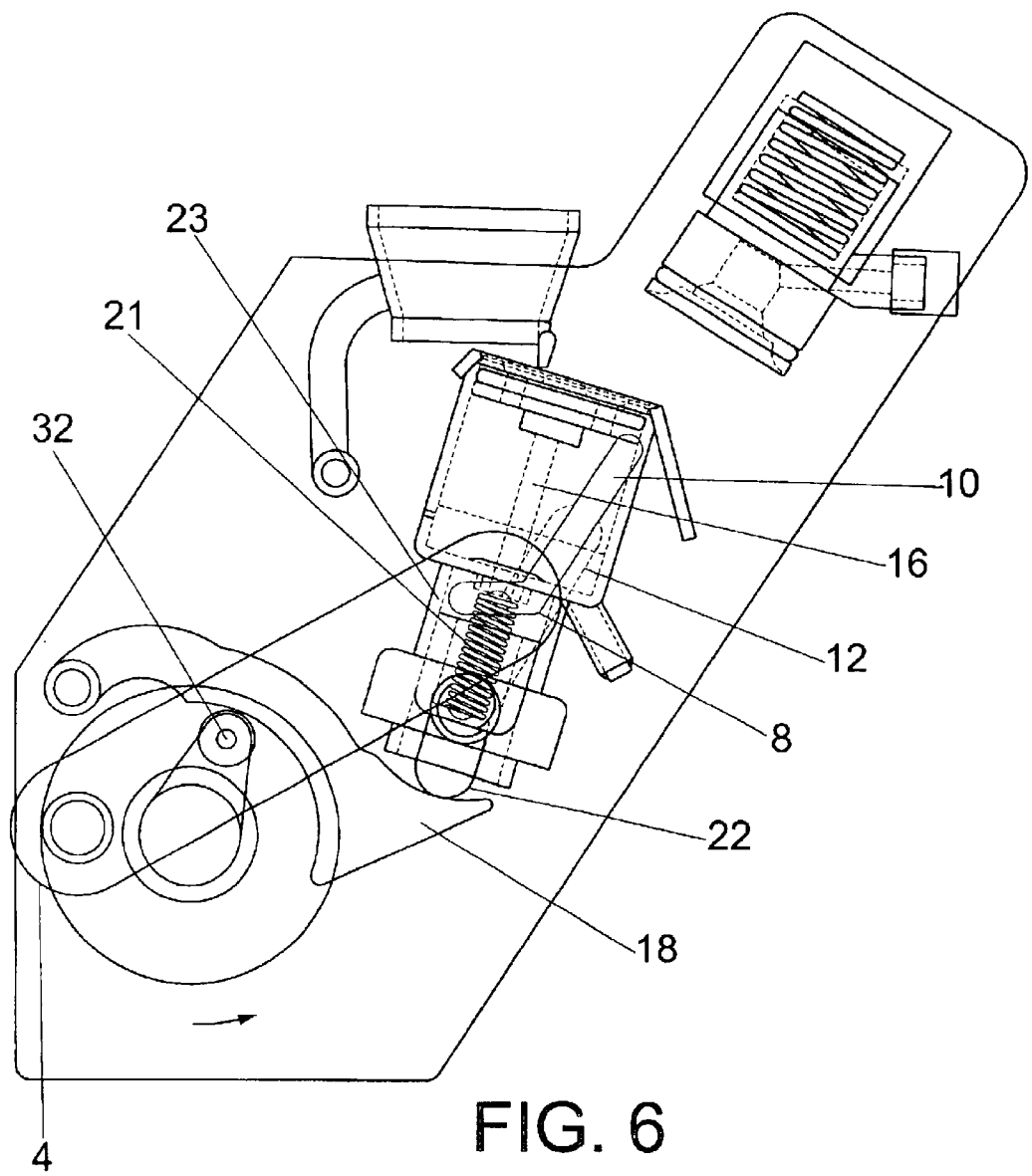
FIG. 6 shows a side raised view of an intermediate position of the distribution chamber moving rotatably towards its resting position under the feeding funnel, it being possible to see how the tablet has been moved.
Figure 7:
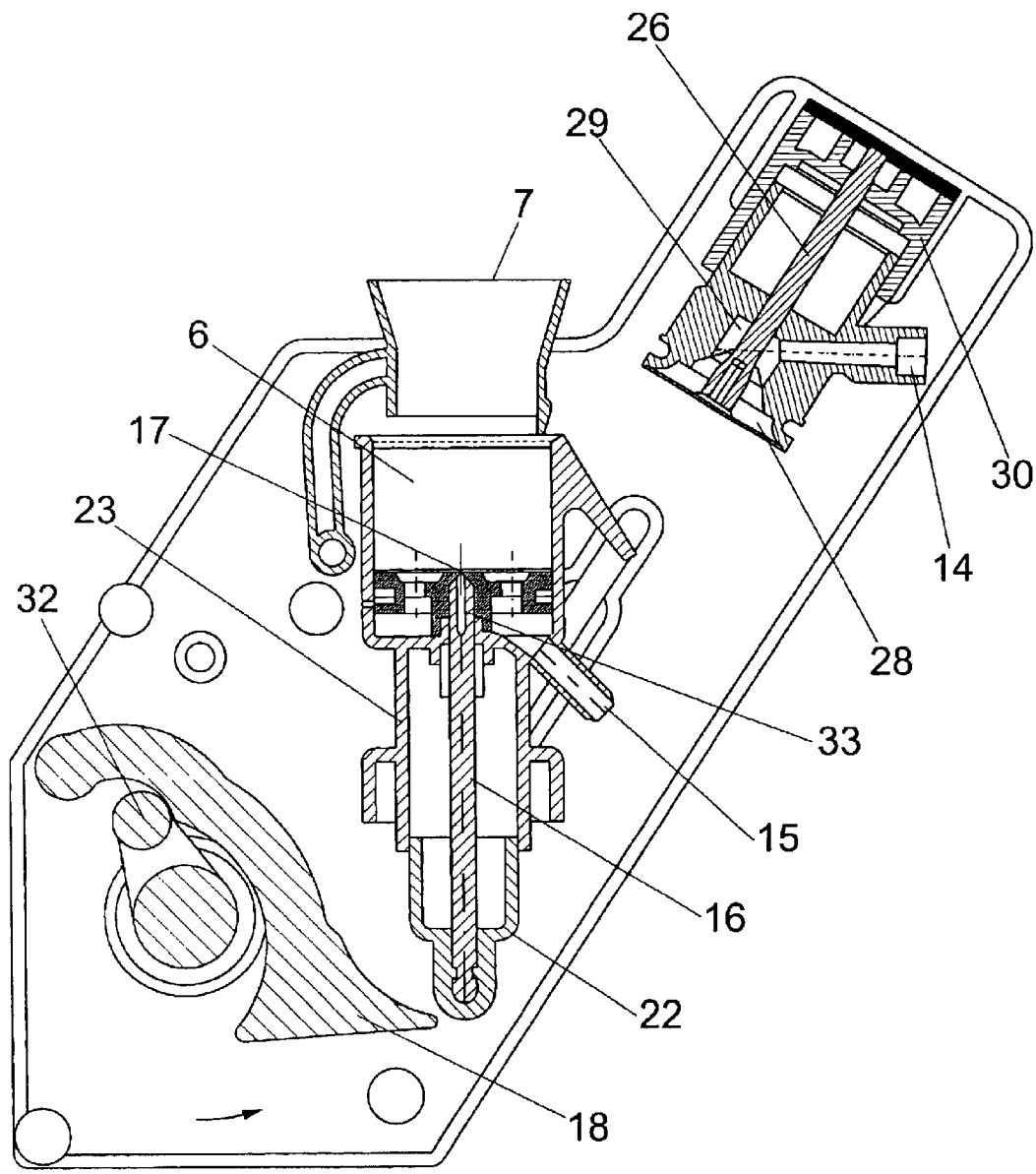
FIG. 7 shows a sectioned view, according to a central crosswise section of the assembly that groups together all the components of the system together.
Figure 8:
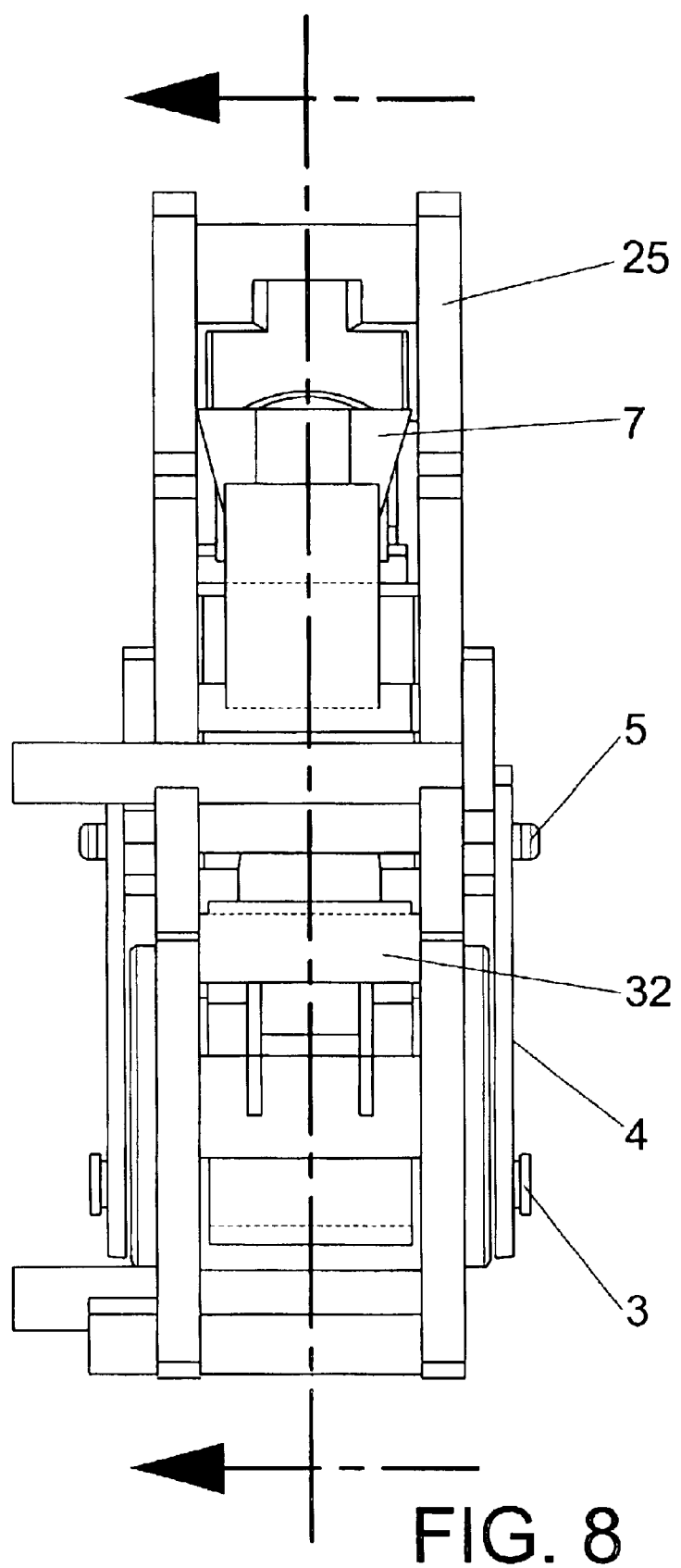
FIG. 8 shows a side raised view of the assembly that groups together all the components of the system, it being possible to see the pair of side walls.
Figure 9:
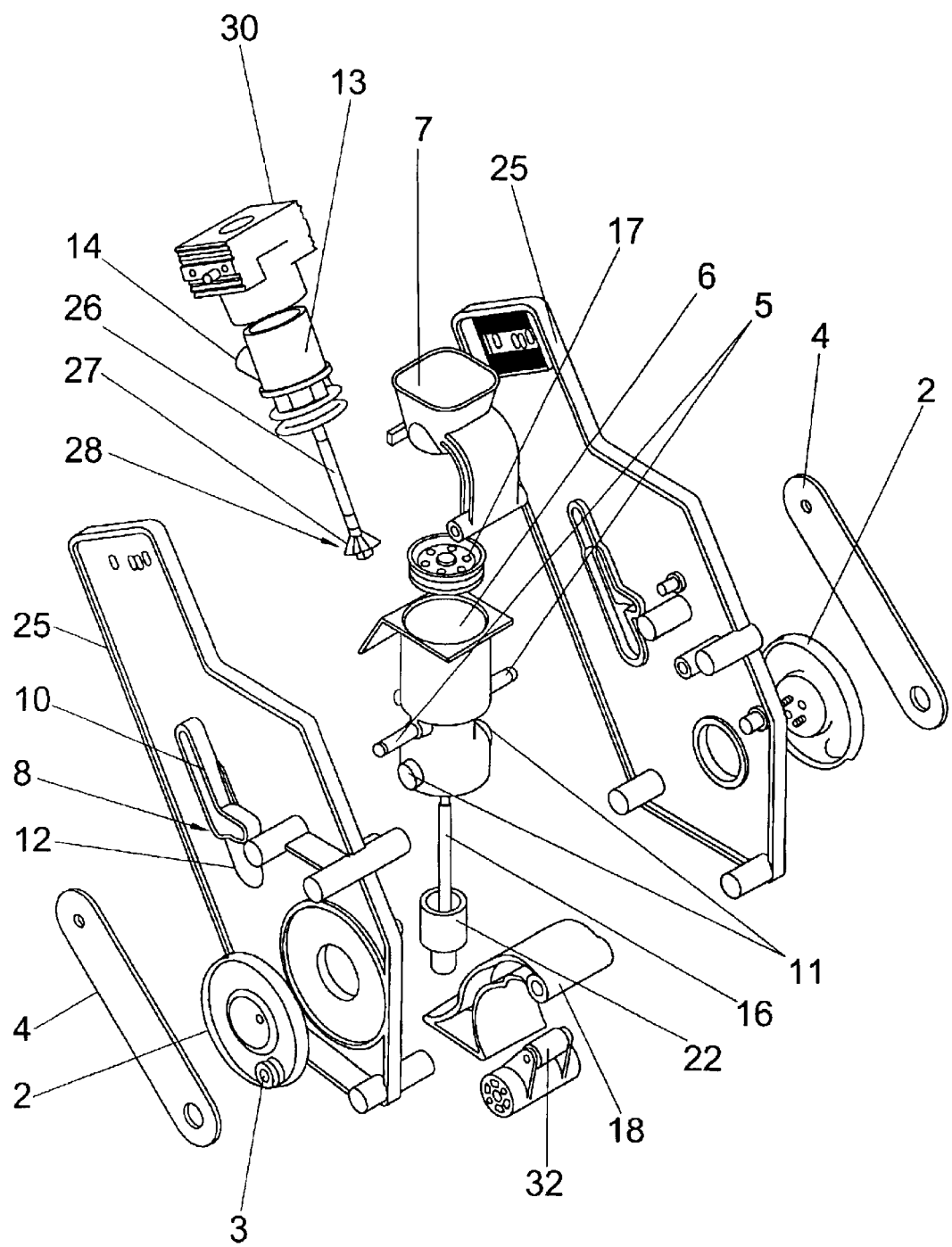
FIG. 9 shows a perspective open view of the assembly that groups together the components of the system.

With the continuous rotation of the pair of wheels (2) the distribution chamber (6) is moved, duly conveyed, by the shafts (5) and (11) guided by the pairs of guides (8) and (12), respectively, until the piston (13) to press the dose of ground coffee housed in it, fits in the distribution chamber (6) (FIG. 4).

In said position the water is supplied through the mouth (14) for the preparation of the cup of coffee. The product prepared comes out through the mouth (15) of the distribution chamber towards the corresponding cup, its release being facilitated upon the distribution chamber (6) being in the inclined position.

Then, the distribution chamber (6) should return to its resting and loading position, for which purpose the pair of wheels (2) are once again actuated, in such a way that the conveying of the pair of connecting rods (4) causes the recoiling of the distribution chamber (6) guided by the shafts (8) and (11), with respect to the corresponding pairs of guides, at the same time that the plate (18) that acts as an abutment element of the shaft (16) of the filter (17), with respect to the stroke regarding the curved-concave section (20) of its top surface, corresponding to the stroke of the eccentric shaft (32) actuating on the section (19) of the bottom surface of the plate (18) concentric with the rotating shaft of the pair of wheels (2).

Upon keeping the shaft (16) in position, the filter (17) is caused to rise until it is level with the free top base of the distribution chamber (6), in such a way that the pressed tablet of coffee is free and with the movement of said distribution chamber (6) with the shaft (5). The tablet abuts against the projection (24) under the funnel body (7) causing it to drop, being moved by the section (9) of the pair of guides (8).

Finally, the distribution chamber remains vertical in its first resting and loading position under the funnel (7) arranged for a new preparation of a cup of coffee, in accordance with the described cycle.

The assembly comprised by the part (30) and the piston (13) can adopt at least two positions in order to adapt it to different amounts of the doses of ground coffee, in such a way that the pressing of the different doses is carried out adequately by means of the piston (13).

What is claimed is:

1. A system for preparing hot beverages in automatic vending machines, especially for preparing coffee, the system comprising an assembly body housing a distribution chamber where a dose of ground coffee is introduced by means of a feeding funnel and pressed by means of a pressing piston, wherein the assembly body comprises:

two side walls arranged one at each side of the distribution chamber, each of the side walls comprising:
a first side guide, implemented by means of a groove comprising a horizontal section and an inclined section,
a second side guide,
a driving rotating wheel, and
a connecting rod provided with a first and a second end, said first end of the connecting rod being connected to the driving rotating wheel at a peripheral part of said driving rotating wheel, and
said second end of the connecting rod, opposite to the first end of the connecting rod; and said distribution chamber, further comprising:
a first transversal shaft which is guided by the first side guide of each side wall, and which passes through said first side guide in order to be connected to the second end of the connecting rod of each side wall,
a second transversal shaft which is guided by the second side guide of each side wall, and
a bottom filter which is housed inside the distribution chamber, said bottom filter being provided with a means for operating said bottom filter, further comprising:
an axial shaft of the bottom filter,
a spring surrounding the axial shaft of the bottom filter, and
a screw fastening the bottom filter to the axial shaft of the bottom filter;

said distribution chamber being movable within the assembly body by means of the first and second transversal shafts moving along respectively the first and second side guides:
from a first vertical resting and product loading position in which the distribution chamber faces the feeding funnel, to a second inclined product preparation position in which the distribution chamber faces and houses the pressing piston in order to press the dose of coffee, this second position corresponding to the first transversal shaft placed in the inclined section of the first side guide of each side wall; said distribution chamber being moved from the first vertical resting and product loading position to the second inclined product preparation position and back to the first vertical resting and product loading position again, by means of the connecting rod of each side wall being actuated by the driving rotating wheel of each side wall.

2. The system for preparing hot beverages in automatic vending machines, according to claim 1, wherein the driving rotating wheel of each side wall actuate the respective connecting rod to which the driving rotating wheel is connected, said connecting rod causing a movement of the distribution chamber from a first vertical resting and product loading position, to a second inclined product preparation, keeping static the bottom filter housed inside the distribution chamber, as well as the means for operating said bottom filter.

3. The system for preparing hot beverages in automatic vending machines, according to claim 1, wherein the second side guide of each side wall is implemented by means of a recess on an internal surface of each side wall facing the distribution chamber; said recess being wider than the groove of the first side guides, enabling the second side guide at approximately half of its length, to be overlapped with the inclined section of the first side guide of each side wall.

4. The system for preparing hot beverages in automatic vending machines, according to claim 2, wherein the second side guide of each side wall is implemented by means of a recess on a internal surface of each side wall facing the distribution chamber; said recess being wider than the groove of the first side guides, enabling the second side guide at approximately half of its length, to be overlapped with the inclined section of the first side guide of each side wall.

5. The system for preparing hot beverages in automatic vending machines, according to claim 1, wherein the means for operating the bottom filter further comprise a pivoting plate arranged between the driving rotating wheels and a lower part of the axial shaft of the bottom filter;
said pivoting plate comprising:
a lower surface, provided with a circular section concentric to a third transversal shaft that couples the driving rotating wheels of both side walls, and
an upper surface, provided with a curved-concave section facing the lower part of the axial shaft of the bottom filter.

6. The system for preparing hot beverages in automatic vending machines, according to claim 1, wherein the third transversal shaft that couples the driving rotating wheels of both side walls is provided with a projection intended to contact the lower surface of the pivoting plate, causing the pivoting plate to pivot, and in turn, causing the upper surface of the pivoting plate to actuate upon the lower part of the axial shaft of the bottom filter.

7. The system for preparing hot beverages in automatic vending machines, according to claim 5, wherein the third transversal shaft that couples the driving rotating wheels of both side walls is provided with a projection intended to contact the lower surface of the pivoting plate, causing the pivoting plate to pivot, and in turn, causing the upper surface of the pivoting plate to actuate upon the lower part of the axial shaft of the bottom filter.

8. The system for preparing hot beverages in automatic vending machines, according to claim 1, wherein the feeding funnel has a base provided with a small projection in order to make the pressed dose of coffee to be released from the distribution chamber when said pressed dose of coffee has risen to the top of the distribution chamber by means of a simultaneous action of:

the connecting rods moving downwards the distribution chamber from the second inclined product preparation position to the first vertical resting and product loading position, and by the pivoting plate rising the axial shaft of the bottom filter and therefore rising as well the bottom filter itself together with the pressed dose of coffee, by means of recoiling the spring that surrounds the axial shaft of said bottom filter.

9. The system for preparing hot beverages in automatic vending machines, according to claim 5, wherein the feeding funnel has a base provided with a small projection in order to make the pressed dose of coffee to be released from the distribution chamber when said pressed dose of coffee has risen to the top of the distribution chamber by means of a simultaneous action of:

the connecting rods moving downwards the distribution chamber from the second inclined product preparation position to the first vertical resting and product loading position, and by the pivoting plate rising the axial shaft of the bottom filter and therefore rising as well the bottom filter itself together with the pressed dose of coffee, by means of recoiling the spring that surrounds the axial shaft of said bottom filter.

10. The system for preparing hot beverages in automatic vending machines, according to claim 6, wherein the feeding funnel has a base provided with a small projection in order to make the pressed dose of coffee to be released from the distribution chamber when said pressed dose of coffee has risen to the top of the distribution chamber by means of a simultaneous action of:

the connecting rods moving downwards to the distribution chamber from the second inclined product preparation position to the first vertical resting and product loading position, and of the pivoting plate raising the axial shaft of the bottom filter thereby raising the bottom filter with the pressed dose of coffee, by means of recoiling the spring that surrounds the axial shaft of said bottom filter.

11. The system for preparing hot beverages in automatic vending machines, according to claim 7, wherein the feeding funnel has a base provided with a small projection in order to make the pressed dose of coffee to be released from the distribution chamber when said pressed dose of coffee has risen to the top of the distribution chamber by means of a simultaneous action of:

the connecting rods moving downwards to the distribution chamber from the second inclined product preparation position to the first vertical resting and product loading position, and by the pivoting plate rising the axial shaft of the bottom filter and therefore rising as well the bottom filter itself together with the pressed dose of coffee, by means of recoiling the spring that surrounds the axial shaft of said bottom filter.

12. The system for preparing hot beverages in automatic vending machines, according to claim 1, wherein the distribution chamber is further provided with a tubular cavity therein, by which the means for operating the bottom filter, including the lower part of the axial shaft of the bottom filter are movable; the distribution chamber further being provided with a base abutting against the bottom filter and the axial shaft of said bottom filter.

13. The system for preparing hot beverages in automatic vending machines, according to claim 5, wherein the distribution chamber is further provided with a tubular cavity therein, by which the means for operating the bottom filter, including the lower part of the axial shaft of the bottom filter are movable; the distribution chamber further being provided with a base abutting against the bottom filter and the axial shaft of said bottom filter.

14. The system for preparing hot beverages in automatic vending machines, according to claim 6, wherein the distribution chamber is further provided with a tubular cavity therein, by which the means for operating the bottom filter, including the lower part of the axial shaft of the bottom filter are movable; the distribution chamber further being provided with a base abutting against the bottom filter and the axial shaft of said bottom filter.

15. The system for preparing hot beverages in automatic vending machines, according to claim 7, wherein the distribution chamber is further provided with a tubular cavity therein, by which the means for operating the bottom filter, including the lower part of the axial shaft of the bottom filter are movable; the distribution chamber further being provided with a base abutting against the bottom filter and the axial shaft of said bottom filter.

16. The system for preparing hot beverages in automatic vending machines, according to claim 8, wherein the distribution chamber is further provided with a tubular cavity therein, by which the means for operating the bottom filter, including the lower part of the axial shaft of the bottom filter are movable; the distribution chamber further being provided with a base abutting against the bottom filter and the axial shaft of said bottom filter.

17. The system for preparing hot beverages in automatic vending machines, according to claim 9, wherein the distribution chamber is further provided with a tubular cavity therein, by which the means for operating the bottom filter, including the lower part of the axial shaft of the bottom filter are movable; the distribution chamber further being provided with a base abutting against the bottom filter and the axial shaft of said bottom filter.

18. The system for preparing hot beverages in automatic vending machines, according to claim 10, wherein the distribution chamber is further provided with a tubular cavity therein, by which the means for operating the bottom filter, including the lower part of the axial shaft of the bottom filter are movable; the distribution chamber further being provided with a base abutting against the bottom filter and the axial shaft of said bottom filter.

19. The system for preparing hot beverages in automatic vending machines, according to claim 11, wherein the distribution chamber is further provided with a tubular cavity therein, by which the means for operating the bottom filter, including the lower part of the axial shaft of the bottom filter are movable; the distribution chamber further being provided with a base abutting against the bottom filter and the axial shaft of said bottom filter.

* * * * *